United States Patent Office 3,237,507
Patented Mar. 1, 1966

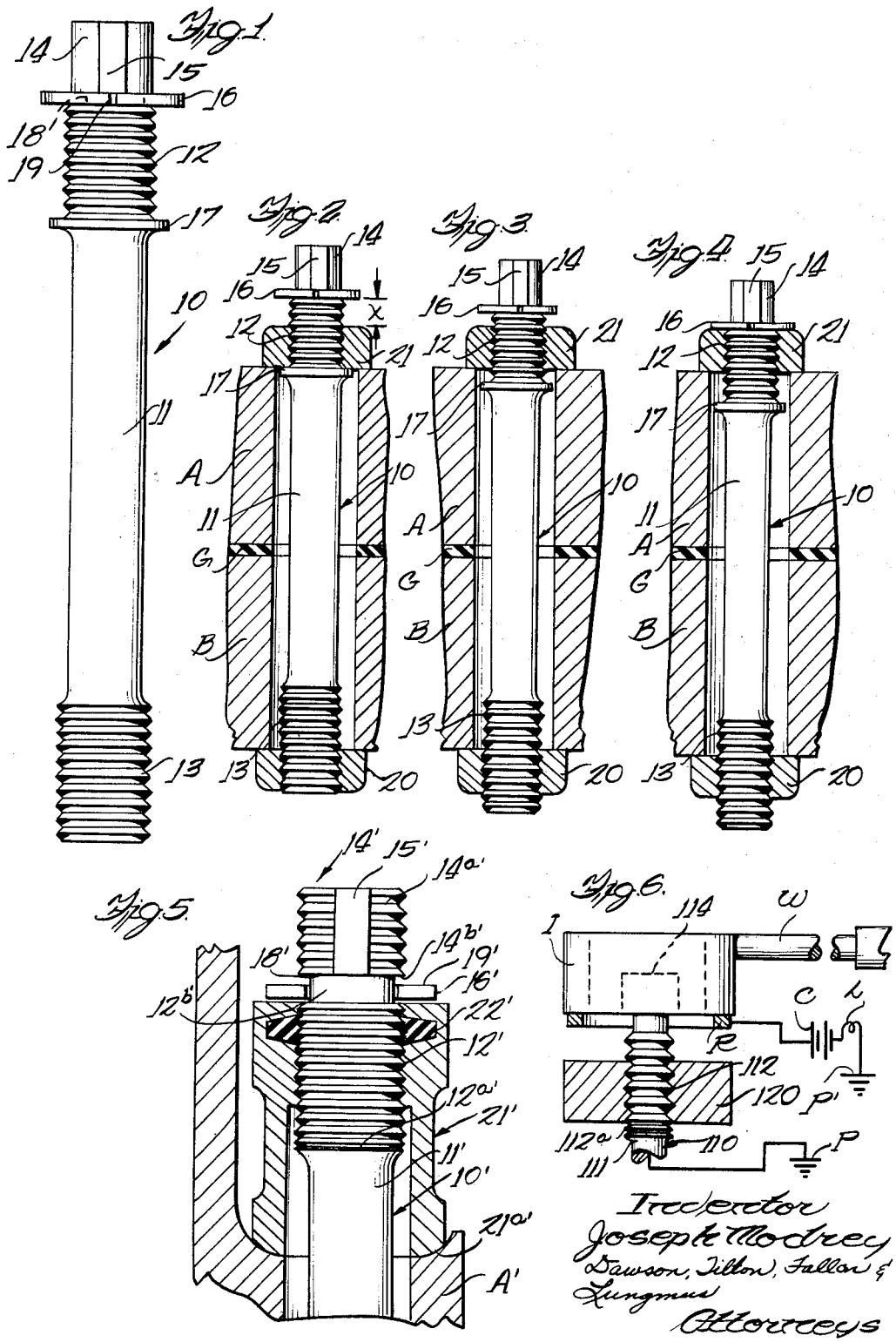

3,237,507
PRELOAD SELF-SETTING BOLT WITH
DIFFERENTIAL THREADS
Joseph Modrey, Schenectady, N.Y., assignor to Midwest Applied Science Corp., Lafayette, Ind., a corporation of Indiana
Filed Dec. 3, 1963, Ser. No. 327,712
7 Claims. (Cl. 85—62)

This invention relates to a preload self-setting bolt, and more particularly, to a bolt and nut assembly for controlling the preload on bolted joints.

In high performance machinery such as high speed power plants, air and space craft, there exists a need for accurately controlling the preload on bolted joints. The most common control device, besides depending on the mechanic's judgment, is the torque wrench. It is known that the relationship between tightening torque and axial bolt load can be defined in the case of a particular bolt as:

$$F = AT$$

where

F = desired axial load
T = applied torque
A = size and friction factor

Unfortunately A varies very drastically with variations in coefficients of friction and errors in thread geometry. Considering variations in A and the mechanic's error in reading the torque wrench, it is unlikely that the force F can be controlled to less than 35% variation. An additional disadvantage of the use of the torque wrench is its awkwardness in confined areas.

In the final analysis, the best technique for controlling F is to measure the stretch in the bolt. Where accuracy counts, and if there are not too many bolts involved, the classical control technique has been one of measuring the bolt stretch with a micrometer. In most applications, however, space and the large number of bolts militate against the "mikeing" technique.

An alternative to measuring the stretch with micrometers is the use of strain gages applied directly to the bolt. While the probable accuracy of preloading such instrumented bolts is excellent, the cost of each bolt is prohibitive and the imposition of the special electronic equipment required raises serious doubts as to the practicality of this procedure outside the laboratory.

Some attempts have been made to equip bolts with means for automatically measuring the stretch of the bolt, but such expedients have not proven very successful. Since the stretch of the bolt under full preload is a very small quantity, devices for measuring this stretch must be manufactured with great precision. For example, if the stretch of the bolt is .005 inch under a full preload of 60,000 p.s.i., a gauge element for automatically determining the desired preload with an error not exceeding 10% would have to be manufactured with a tolerance of .00025 inch. Any such control device would obviously involve a high manufacturing cost.

Therefore, a general object of the present invention is to provide a preload self-setting bolt which substantially overcomes the problems and difficulties described above. More specifically, it is an object to provide a bolt and nut assembly for controlling the preload on bolted joints by incorporating means for more accurately determining the stretch in the bolt under full preload without at the same time unduly increasing the manufacturing cost of the assembly. Further objects and advantages will be indicated in the following detailed specification.

This invention is based in part on the discovery of a means whereby the bolt itself can be used as a micrometer for measuring its own stretch. As will subsequently be described in greater detail, this means includes a differential thread structure which has the effect of magnifying the stretch of the bolt so that it can be readily observed, and so that excessive manufacturing precision is not required.

In its simplest form, the preloading of the bolt can be accurately determined by merely counting the number of revolutions of the bolt required to obtain the desired preload. This can be done even though normal thread spacing is used. By the differential threading principle of this invention, the number of turns required to obtain the desired preload is greatly magnified, and therefore subject to the ready observation of the mechanic applying the bolt and nut assembly. For example, as many as four complete turns of the bolt may be required from the beginning of the application of the preload up to full load. This result, of course, would not be possible by merely employing finer or more closely spaced threads. There is a limit to the fineness of threads which can be formed on bolts and nuts, and with ordinary pitch threads much less than one revolution of the bolt would be required for applying the full preload.

In accordance with the present invention there is provided a bolt and nut assembly wherein the bolt is equipped with a shank on each end thereof, and each of the shanks includes a threaded portion. In other words, the bolt has the configuration of a stud. However, as distinguished from a stud, means are provided for rotating the bolt while the cooperating nuts remain stationary. It will be understood, however, that in the device of this invention a nut is threadedly received on each of the threaded portions of the bolt shanks for travel thereon. This bolt and nut assembly is characterized by the use of differential threading as referred to above. In applying this principle for the purposes of this invention, it is essential that the threads on one of the shanks are more closely spaced than the threads on the other of the shanks. To put this another way, one of the threaded shank portions should have a greater thread pitch than the other. For example, in one preferred embodiment, one of the shank portions is provided with a 21-pitch thread while the other shank portion is provided with a 20-pitch thread, thereby obtaining one more thread per inch on one of the threaded shank portions than on the other.

The present invention is shown in illustrative embodiments in the accompanying drawing, in which—

FIGURE 1 is an elevational view of a bolt incorporating the preload self-setting features of the present invention;

FIGURES 2–4 are axial sectional views of a bolted joint to which a bolt and nut assembly has been applied, the views illustrating the various stages in the application of the preload, FIGURE 2 illustrating the initial stage, FIGURE 3 an intermediate stage, and FIGURE 4 the final stage;

FIGURE 5 is a fragmentary axial sectional view of a modified bolt assembly applied to a bolted joint; and FIGURE 6 is a diagrammatic view of an electrical indicator system which can be used in combination with a bolt assembly constructed in accordance with the present invention.

Referring now to the more detailed description of the drawings, there is shown in FIGURE 1 a bolt designated generally by the number 10 which includes an elongated body 11 and shanks 12 and 13. In the illustration given, shank 13 is fully threaded in the outer end thereof, while shank 12 provides an outer end portion 14 for receiving a wrench, the end portion 14 being provided with a spline drive at 15. It will be understood that other means can be provided for rotating bolt 10, such as an ordinary bolt head.

In the embodiment of FIGURE 1, the shank end 12 is provided with a pair of axially spaced-apart stops, which are in the form of annular flanges 16 and 17. As will be noted, the threaded portion of the shank extends between the outer annular flange 16 and the inner flange 17. The inner flange can be formed integrally with the body 11 of the bolt. However, the outer flange 16 is preferably formed as a separate snap ring, which can be applied to the shank end 12 and received thereon in an annular recess 18, as indicated in FIGURE 1. For this purpose, it will be understood that ring 16 will be split or divided as indicated at 19, and that the ring will be applied to the shank after the cooperating nut has been run onto the shank. In other words, the nut, such as the nut 20, as shown in FIGURES 2–4, will be threadedly received on the shank for travel between the inner flange 17 and the outer flange 16. With this construction, outer flange 16 can easily be made of larger diameter than inner flange 17 for the purpose of more firmly engaging the outer face of the nut 20 as the condition of full preload is reached, as shown in FIGURE 4.

From what has been previously said, it will be understood that shanks 12 and 13 should be differentially threaded, that is, one of the shanks would have threads of a greater pitch than the other, thereby providing fewer threads per inch. For example, the threaded portion of shank 12 can be provided with more closely spaced threads than shank portion 13. For the purpose of illustration, the difference in the pitch of the threads has been somewhat exaggerated. However, in achieving the maximum advantages of the present invention the difference in the threading at each end of the shank would not be readily observable to the eye, as would be the case in a typical embodiment where the shank portion 12 is provided with 21 threads per inch, while the shank portion 13 is provided with 20 threads per inch. With such a threading differential, 4 to 5 turns of a bolt might be required to apply the full preload.

The operation of the complete bolt assembly is shown more clearly in FIGURES 2–4. As there shown, the shank end 13 is provided with a cooperating nut 20, while the shank end 12 is provided with a cooperating nut 21. It will be understood that the pitch of the threads of nut 21 will be the same as the threads on shank 12, while the threads of nut 20 will be the same as shank 13. Usually, right-hand threads will be employed on the shank portions, although the invention can also be used with left-hand threads, providing both shank portions have threads of the same hand.

In FIGURES 2–4, the bolt assembly, consisting of the bolt 10 and the nuts 20 and 21, is shown as being applied to a bolted joint, which in the illustration given includes flanges A and B which are being bolted together with a gasket G therebetween. It will be understood that this bolted joint is merely illustrative.

FIGURE 2 illustrates the initial stage of application of the bolt. Before assembly, the inner face of nut 21 is bottomed on flange 17. In the initial stage of application, flange 17 is level with the outer face of flange A. The inner face of nut 20 bears against the outer face of flange B, as it would when nut 20 has been tightened to a "finger-tight" condition. In other words, the bolt assembly in FIGURE 2 snugly engages the joint, but is essentially under no preload.

In applying the load, the nuts 20 and 21 remain or are held substantially stationary while the bolt 10 is rotated by means of the head 14 which is equipped with the spline drive 15. This permits a spline wrench to be applied to head 14 for the rotation of the bolt. The bolt will be rotated in a direction to cause shank 13 to move outwardly through nut 20. At the same time, the threaded shank 12 will move inwardly through nut 20, but at a slightly slower rate than the outward movement of shank 13. This is due to the thread differential, as previously described. By having more threads per inch on shank 12, and correspondingly on nut 21, than on shank 13 and nut 20, the axial movement of shank 12 with respect to nut 21 is slightly less than the axial movement of shank 13 with respect to nut 20. The result of this action is that the bolt is "stretched," the elongation resulting in the desired preloading.

In the course of the development of this invention, it has been determined that there is a definite mathematical relation between a given preload on a bolt and the number of rotations of the bolt required to obtain this preload where the shank portions are differentially threaded. Consequently, as previously indicated, the condition from zero to maximum preload can be observed by counting the rotations of the bolt. Alternatively, the movement of the bolt relative to one or both of the nuts can be observed as an indicator of the preload. By the differential threading construction of this invention, the movement of the nut relative to the bolt is magnified so that it can be easily observed by various simple mechanical means. For example, in the embodiment of FIGURES 1–4, the movement of the nut 21 permits position with its inner face in engagement with flange 17 to a position where its outer face engages flange 16 will represent the required relative movement for achieving the predetermined loading of the bolt. In FIGURE 2, the preload distance is indicated by the letter X, representing the distance from the outer face of bolt 21 to the inner face of flange 16 at the start of the preloading.

As the mechanic rotates bolt 10, nut 21 will move toward flange 16. An intermediate condition is illustrated in FIGURE 3 where the nut 21 has moved away from flange 17 and is approaching flange 16. In FIGURE 4, the completed preloading is shown, where the outer face of nut 21 is in firm engagement with the inner face of flange 16. The achievement of this condition can be observed visually by the mechanic. It will also be signalled by the sharp increase in the force required to rotate the bolt. As will subsequently be described, other signal means can be utilized in conjunction with the bolt and nut assembly of this invention.

A modified bolt and nut assembly is shown in FIGURE 5. This construction may be preferred in adapting the assembly for automatic production, and for minimizing bending moments on the joint flanges by permitting smaller flanges to be employed. This can result in reduced fatigue and shock failures on bolted joints.

In the embodiment of FIGURE 5, the corresponding parts have been given the same numbers as in the embodiment of FIGURES 1–4 except that the numbers have been primed. In this embodiment, the bolt is machined from a piece of rod stock with a minimum of cutting loss. To achieve this result, the outside diameter of the spline driving head 14' is the same as the outside diameter of the threaded portion of shank 12', and no other parts of the bolt are of larger diameter. The lands 14a' of the spline head are threaded like shank 12'. Instead of the inner flange stop 17, as provided in the embodiment of FIGURES 1–4, the threads at the inner end of shank 12' are crimped, as indicated at 12a'. The crimped threads 12a' function as an inner stop for the nut 21', which is in the form of an elongated tubular member having an internally threaded outer end portion which cooperates with the threads on shank 12', as shown. The tubular nut 21' has an inward extension around the bolt body 11', which terminates in a convex seating portion 21a' that engages a concave seat provided by flange A'.

In the embodiment of FIGURE 5, the annular recess 18' is enlarged, and the snap ring 16' divided at 19' is slidably received on the reduced shank portion 12b' for movement between the outer end of the threaded portion and the shoulder 14b' at the inner end of head 14'.

With the construction just described, the application of the preload by the rotation of bolt 10 will cause nut 21' to lift the snap ring 16' and move it along reduced shank portion 12b' until it engages shoulder 14b'. This engagement will signal the end or completion of the preloading in the same manner as previously described with respect to flange 16 of the embodiment of FIGURES 1–4.

It will be understood that the other end of bolt 10' will be provided with a threaded shank portion similar to the shank portion 13 in the embodiments of FIGURES 1–4. The nut for engaging this shank portion can be formed in a manner similar to the nut 21', that is, it will be of tubular configuration, and will be adapted for engaging the convex seat on the flange complementary to flange A'. If desired, the nuts can be equipped with nylon elastic locks, such as the lock 22, as shown in FIGURE 5.

The embodiment of FIGURE 5 has the further advantage that the convex-concave seating surfaces, respectively, of nut end 21' and the upper end portion of flange A', tend to amplify the friction lock-up of the nut, thereby tending to prevent rotational slippage of the nut 21' as the preload is applied. With respect to the embodiment of FIGURES 1–4, it will be understood that nuts 20 and 21 should also remain stationary, that is, without rotational slippage, during the application of the preload. If the frictional interlock between the inner surfaces of the nuts and the flanges A and B is insufficient to accomplish this result, various means can be employed to improve the friction lock-up of these nuts as soon as a finger-tight condition is reached. Alternatively, one of the nuts can be rigidly connected to or integrally formed with the adjacent flange member. For example, the nut 20' might be formed as part of the flange B.

In combination with the present invention, it is contemplated that electrical indicator means can be provided for signalling when one or both of the nuts has travelled a predetermined distance, thereby indicating the completion of the preloading. Such an arrangement is illustrated diagrammatically in FIGURE 6. As there shown, the bolt 110 has a body portion 111 and a threaded shank end 120 which terminates in a spline drive head 114. The inner stop on shank 120 is provided by a crimped thread portion 120a, similar to the one described for the embodiment of FIGURE 5. Bolt 110 is shown being rotated by a socket wrench W.

To provide an electrical indicator for the completion of the preloading, all that is required is to ground bolt 110 as indicated at P, and to equip wrench W with means for completing an electrical circuit when nut 120 has moved the desired distance outwardly on the threaded portion of shank 112 from the crimped stop means 112a. In the illustration given, the underside of the wrench head is provided with a downwardly-projecting conductor ring R which is mounted on an insulated outer portion I of the wrench head. Circuit means is provided for connecting ring R with a source of electric current which is a dry cell C. Some electric indicator means should also be included in the circuit, such as a light L, and the circuit can be completed through another ground connection P'. With this construction, when the outer face of nut 120 engages the inner face of conductor ring R, the circuit will be completed, and light L will flash. Alternatively, other electric indicator means can be used. If wrench W is power driven, as may be the case for an automatic torque wrench, the resulting electric signal can be used to operate a solenoid to stop the operation of the wrench.

It will be understood that the differential threading principle of the present invention will usually be applied to threads of standard numbers. However, the difference between the two thread numbers per inch need not be a whole number, but may be a fractional number. As indicated in the foregoing description, the difference between the number of threads per inch may be rather small, and, in fact, the sensitivity of the bolt assembly to preload control tends to increase as the difference becomes smaller. On the other hand, certain practical considerations enter in. It is desirable to make the threads on both shanks coarse enough so that they will have sufficient mechanical strength. Furthermore, if the threads are too fine or the differential is too small, the bolt assembly may tend to jam itself as the preload is applied.

While in the foregoing specification this invention has been described in relation to particular embodiments thereof, and many details have been set forth for purpose of illustration, it will be apparent to those skilled in the art that the invention is susceptible to additional embodiments, and that many of the details described herein can be varied considerably without departing from the basic principles of the invention.

I claim:

1. In a bolt and nut assembly for preloading bolted joints, including a bolt having a shank on each end thereof, each of said shanks providing a threaded portion, nut means threadedly received on each of said shank threaded portions for travel with respect thereto, the threads of both shanks being of the same hand but the threads on one of said shanks being of a greater pitch than the threads on the other of said shanks, and means for rotating said bolt while said nut means remain stationary on each side of a bolted joint to stretch said bolt and thereby apply preload to a joint being bolted by said assembly, the improvement comprising a pair of axially spaced-apart stop means provided on one of said shanks for the one of said nut means thereon, the threaded portion of said shank with said one nut means thereon extending between said stop means said one nut means engaging the inner of said stop means in one position and the outer of said stop means in another position, said inner and outer stop means being effective respectively to terminate the inner and outer travel of said nut means at predetermined points, whereby said assembly provides a built-in indicator for applying a precisely controlled and predetermined preload.

2. In a bolt and nut assembly for preloading bolted joints, including a bolt having a shank on each end thereof, each of said shanks providing a threaded portion, a nut threadedly received on each of said shank threaded portions for traveling thereon, the threads of both shanks being of the same hand but the threads on one of said shanks being of lesser pitch than the threads on the other of said shanks, means for rotating said bolt while said nuts remain stationary, the improvement comprising indicator means for signalling when the one of said nuts on the one of said shank portions having said lesser pitch has traveled a predetermined distance as said bolt is being stretched in the loading of a bolted joint, said indicator means including stop means at the inner end of said one shank portion cooperating with the nut thereon to mark the beginning of the preload travel of said one nut, and stop means at the outer end of said one shank to mark the end of travel of said one nut.

3. In a bolt and nut assembly for preloading bolted joints, including a bolt having a shank on each end thereof, each of said shanks providing a threaded portion, a nut threadedly received on each of said threaded shank portions for travel thereon, the threads of both of said shank portions being of the same hand but the threads on one of said shank portions being of greater pitch than the threads on the other of said shank portions, means for rotating said bolt while said nuts remain stationary, the improvement comprising a pair of axially space-apart stops on one of said shank portions with the threaded portion thereof extending therebetween and one of the said nuts traveling between said stops, the inner one of said stops comprising crimped threads, and the outer one of said stops comprising an outwardly extending ring, said inner and outer stop means being effective respectively to terminate the inner and outer travel of said one nut at predetermined points.

4. In a bolt and nut assembly for preloading bolted joints, including a bolt having a shank on each end thereof, each of said shanks providing a threaded portion, nut means threadedly received on each of said shank threaded portions for travel with respect thereto, the threads of both shanks being of the same hand but the threads on one of said shanks being of a greater pitch than the threads on the other of said shanks, and means for rotating said bolt while said nut means remain stationary on each side of a bolted joint to stretch said bolt and thereby apply preload to a joint being bolted by said assembly, the improvement comprising a pair of axially spaced-apart stop means provided on one of said shanks for one of said nut means thereon, the threaded portion of said shank with said one nut means thereon extending between said stop means, said one nut means engaging the inner of said stop means in one position and the outer of said stop means in another position, said inner and outer stop means being effective respectively to terminate the inner and outer travel of said nut means at said predetermined points, and an indicator ring slidably received on said one of said shanks between the nut means thereon and said outer stop means, whereby said ring comes into engagement with said outer stop means as said nut means reaches the outer limit of travel on said shank and thereby said assembly provides a built-in indicator for applying a precisely controlled and predetermined preload.

5. In a bolt and nut assembly for preloading bolted joints, including a bolt having a shank on each end thereof, each of said shanks providing a threaded portion, nut means threadedly received on each of said shank threaded portions for travel with respect thereto, the threads of both shanks being of the same hand but the threads on one of said shanks being of a lesser pitch than the threads on the other of said shanks, and means for rotating said bolt while said nut means remain stationary on each side of a bolted joint to stretch said bolt and thereby apply preload to a joint being bolted by said assembly, the improvement comprising a pair of axially spaced-apart stop means provided on said one of said shanks for one of said nut means thereon, the threaded portion of said shank with said one nut means thereon extending between said stop means, said one nut means engaging the inner of said stop means in one position and the outer of said stop means in another position, said inner and outer stop means being effective respectively to terminate the inner and outer travel of said nut means at said predetermined points, said one of said threaded shank portions being provided at its outer end with said outer stop means, and a split indicator ring slidably received on said one shank for axial movement between the nut means thereon and said outer stop means, whereby said assembly provides a built-in indicator for applying a precisely controlled and predetermined preload.

6. In a bolt and nut assembly for preloading bolted joints, including a bolt having a shank on each end thereof, each of said shanks providing a threaded portion, a nut threadedly received on each of said shank threaded portions for travel thereon, the threads of both shanks being of the same hand but the threads on one of said shanks being of lesser pitch than the threads on the other of said shanks, means for rotating said bolt while said nuts remain stationary, the improvement comprising indicator means for signalling when the one of said nuts on the one of said shank portions having said lesser pitch has traveled a predetermined distance as said bolt is being stretched in the loading of a bolted joint, said indicator means including stop means at the inner end of said one shank portion cooperating with the nut thereon to mark the beginning of the preload travel of said one nut, means at the outer end of said one shank to mark the end of travel of said one nut, said one shank portion being provided at its outer end with a stop shoulder, and a split indicator ring slidably received on said one shank portion between said one nut and said stop shoulder, said stop shoulder engaging said ring and limiting the outer movement thereof, said ring in turn engaging and limiting the outer travel of said one nut.

7. In a bolt and nut assembly for preloading bolted joints, including a bolt having a shank on each end thereof, each of said shanks providing a threaded portion, a nut threadedly received on each of said threaded shank portions for travel thereon, the threads of both of said shank portions being of the same hand but the threads on one of said shank portions being of greater pitch than the threads on the other of said shank portions, means for rotating said bolt while said nuts remain stationary, the improvement comprising a pair of axially spaced-apart stops on one of said shank portions with the threaded portion thereof extending therebetween and with one of the said nuts traveling between said stops, the inner one of said stops comprising crimped threads, and the outer one of said stops comprising an outwardly extending ring, said inner and outer stop means being effective respectively to terminate the inner and outer travel of said one nut at predetermined points, said outer stop ring being divided to facilitate application to said one shank and being slidably received thereon for axial movement between inner and outer positions.

References Cited by the Examiner
UNITED STATES PATENTS

| | | | |
|---|---|---|---|
| 782,366 | 2/1905 | Stroud | 151—69 |
| 2,320,286 | 5/1943 | Lambert | 85—188 |
| 2,464,152 | 3/1949 | Ralston | 85—62 |
| 2,485,280 | 10/1949 | Grace | 85—62 |
| 2,648,833 | 8/1953 | Wilson et al. | 85—62 |
| 2,726,106 | 12/1955 | Houck | 151—69 |

EDWARD C. ALLEN, *Primary Examiner.*